US010123674B2

(12) United States Patent
Gordon et al.

(10) Patent No.: US 10,123,674 B2
(45) Date of Patent: Nov. 13, 2018

(54) COGNITIVE VACUUM CLEANER WITH LEARNING AND COHORT CLASSIFICATION

(71) Applicant: International Business Machines Corporation, Armonk, NY (US)

(72) Inventors: Michael S. Gordon, Yorktown Heights, NY (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 15/261,490

(22) Filed: Sep. 9, 2016

(65) Prior Publication Data

US 2018/0070787 A1    Mar. 15, 2018

(51) Int. Cl.
*A47L 11/40* (2006.01)
*A47L 9/28* (2006.01)
*G05D 1/02* (2006.01)

(52) U.S. Cl.
CPC .......... *A47L 9/2815* (2013.01); *A47L 9/2826* (2013.01); *A47L 9/2842* (2013.01); *A47L 9/2847* (2013.01); *A47L 9/2852* (2013.01); *A47L 9/2857* (2013.01); *G05D 1/02* (2013.01); *A47L 2201/04* (2013.01); *A47L 2201/06* (2013.01); *Y10S 901/01* (2013.01); *Y10S 901/46* (2013.01)

(58) Field of Classification Search
CPC ............. A47L 2201/04; A47L 2201/06; A47L 9/2842; A47L 9/2815; A47L 9/2826; A47L 9/2847; A47L 9/2873; A47L 11/4011; Y10S 901/01; Y10S 901/46; B25J 11/0085; B25J 9/0003; B25J 9/163
USPC ................. 700/245, 253; 15/319, 347, 340.1
See application file for complete search history.

(56) References Cited

U.S. PATENT DOCUMENTS

| 5,319,827 | A | 6/1994 | Yang | |
|---|---|---|---|---|
| 5,722,109 | A | 3/1998 | Delmas et al. | |
| 9,230,313 | B2 | 1/2016 | Yamazaki et al. | |
| 2004/0211444 | A1* | 10/2004 | Taylor | A47L 9/2805 |
| | | | | 134/18 |
| 2005/0192707 | A1* | 9/2005 | Park | A47L 9/281 |
| | | | | 700/259 |
| 2007/0282484 | A1* | 12/2007 | Chung | G05D 1/0274 |
| | | | | 700/245 |
| 2014/0025613 | A1 | 1/2014 | Ponulak | |
| 2014/0124004 | A1* | 5/2014 | Rosenstein | A47L 9/2852 |
| | | | | 134/18 |

(Continued)

FOREIGN PATENT DOCUMENTS

| CN | 101387876 A | 3/2009 |
|---|---|---|
| CN | 205054014 U | 3/2016 |

(Continued)

*Primary Examiner* — Dalena Tran
(74) *Attorney, Agent, or Firm* — Cahn & Samuels, LLP (57) ABSTRACT

A method, system and computer program product for modifying a cleaning routine of a mobile cleaner scans the surface to collect debris data, the debris data including an amount and location of debris on the surface. A profile of the surface is updated with the collected debris data. A profile of the surface is analyzed to identify a debris region on the surface, the debris region including an amount of debris differs from a high threshold. A cleaning routine of the mobile cleaner is modified based on the profile.

20 Claims, 3 Drawing Sheets

(56) References Cited

U.S. PATENT DOCUMENTS

2014/0207281 A1\* 7/2014 Angle ................ H04L 12/282
                                                                                                     700/257
2015/0197011 A1 7/2015 Gutmann et al.

FOREIGN PATENT DOCUMENTS

| EP | 490736 A2 | 6/1992 |
| EP | 2524640 A1 | 11/2012 |
| JP | 04250126 | 9/1992 |
| JP | 04279133 A | 10/1992 |
| JP | 2006071455 A | 3/2006 |
| JP | 2007117146 A | 5/2007 |

\* cited by examiner

COGNITIVE VACUUM CLEANER WITH LEARNING AND COHORT CLASSIFICATION

BACKGROUND

The present invention relates to systems, methods, and computer program products for a cognitive cleaner with learning and cohort classification. A cleaner is a device that is used to pick up dirt, dust and other debris, usually from carpets, floors, and other hard and flat surfaces. A vacuum-type cleaner often collects debris (solid and/or liquid) by means of a partial vacuum, such as may be created by a centrifugal fan in the vacuum cleaner, and deposits the debris in a bag or removable bin in the vacuum cleaner.

SUMMARY OF THE INVENTION

An embodiment of the invention provides a computer-implemented method, system, and computer program product for modifying a cleaning routine of a mobile cleaner. A surface area is traversed via a mobile cleaner. The surface area is scanned and debris data is collected including amounts and locations of debris on the surface area. Collected debris data is analyzed and at least one location of the surface area is identified as having an amount of debris that differs from a threshold. The cleaning routine is modified in response to the analyzing and identifying.

BRIEF DESCRIPTION OF THE SEVERAL VIEWS OF THE DRAWINGS

Embodiments of the present invention are described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a method and system including a vacuum cleaner (also referred to herein as a "mobile cleaner") and a learning module associated with the mobile cleaner that facilitates learning of environmental patterns of dust and dirt from floors so that more time and energy can be devoted to regions more likely to be dirtier. The learning module can learn high-level classifications of the patterns for user cohorts and history. For example, the learning module can learn that homes with dogs are usually dirty near the steps. Also, using deep neural nets, the learning module may estimate what substances the dirt may correspond to, along with the dirt's spatial extent (e.g., also using machine vision). Based on the learning module, the vacuum cleaner can deploy a particular cleaning method and pattern.

The system can be particularly useful given the finite battery life of mobile vacuum cleaners. Thus, the vacuum cleaner can facilitate a triage where the device spends time/energy, and risk analysis, in a situation of limited battery life. The system may learn that debris resides, with a certain likelihood, near where steps, sofas, coffee tables, lamps, dog bowls, highchairs, and other objects are located. The relative probabilities may change for cohorts such as families with children, single people, elderly people, people with obsessive compulsive disorder (OCD), autism, pre-Alzheimer's, Alzheimer's, etc. Further, the system can learn shedding characteristics of particular animal types. For example, dog type A is more likely to shed in the summer, and dog type B does not tend to shed. A user can provide input to the vacuum cleaner indicating the type of pet(s) located in the house.

In at least one further embodiment, the vacuum cleaner includes rotating side brushes to pick up lingering debris. In at least one alternative embodiment to the above embodiment, the vacuum cleaner can also have a vision mechanism (or other sensors) to identify the type of surface being cleaned (e.g., wooden floor, carpet, kids playmat, ceramic, stone, epoxy, wood, metal, cementitious, rubber, etc.) and adjust cleaning accordingly (e.g., amount of suction power, speed of rotating bristles, speed of movement over the surface). The neural network may assist in recognizing and classifying the floor type as a function of various inputs, such as visual input, friction and smoothness of surface. Other non-carpet floor types may include asphalt tiles, brick flooring, ceramic tiles, hardwood, linoleum, vinyl, marble, etc.

The vacuum cleaner may predict the actions of users and home inhabitants and use identified patterns to optimize the vacuuming process. For example, the vacuum cleaner can spend more time and/or power in predicted high activity areas of home inhabitants. This can help to minimize power consumption and disturbances in areas that do not need to be vacuumed. The vacuum cleaner can be a robot with autonomous operation.

In at least one embodiment, the vacuum cleaner might learn, for example, that on Sunday night, there is often ash on the carpet by the fireplace. A calendar can include information about parties at the home, playdates for kids, etc. In some sense, the vacuum cleaner may predict future actions (with a confidence level L) based on previous actions. As an example, if the homeowners leave ash by the fireplace every Sunday night because they have used the fireplace, it is likely they may continue to do so, at least for a season. Similarly, if there is party debris on Saturday nights when parties are scheduled on the calendar, this information may be useful. If a vacuum cleaner has limited battery power, it is advantageous that it predict where it should focus at least some of its time and energy.

The vacuum cleaner system may be provided as a service. For example, the vacuum cleaner system may provide advice to a user via e-mail or an electronic display on the device based on the machine learning (e.g., "You may wish to be careful eating pistachio nuts near the couch.") In at least one embodiment, the system identifies the type of debris with an optical sensor and a processor, receives the floor plan including furniture arrangement from a user, and determines its location via GPS, visual cues, and/or WLAN strength. The vacuum cleaner and learning modules can also receive input from online resources, such as a weather website and/or an electronic calendar of a user that indicates, for example, special occasions like parties in a home, a play date for children, etc.

Based on learning and estimating, the vacuum cleaner may change its level of suction to save energy in areas that have been learned to be likely cleaner than other areas. Based on learning, the vacuum cleaner may predict when the vacuum cleaner bag will be full and need to be emptied to avoid loss of vacuum efficiency, based on a number of factors and parameters.

The vacuum cleaner cleaning method in a further embodiment includes ultra-violet sterilization, deployment of additional spinning brushes, mopping, the deployment or spraying of cleaning solution or disinfectant onto microfiber pads. The vacuum cleaner cleaning method in additional embodiments may include the deployment of additional domestic robots, service robots, and/or autonomous robot that is used for household cleaning.

The cognitive characteristics of one or more people in the home (e.g., a fussy homeowner, a happy or depressed homeowner, a homeowner with OCD) may be estimated or learned, and this estimation may be considered along with the time of day, day of the week, etc. For example, certain cohorts may be more focused on cleaning needs in the morning, while others may be more concerned in the evening. Some cohorts may want a clean house when they leave in the morning for work, while others may find it disconcerting to retire for the evening with a filthy home. Also, when performing an estimation, timing may be considered. Not only may this directly help with cleaning, but also it may help with determining a cohort. For example, someone with Alzheimer's disease may exhibit large changes in how they act in the late afternoon or early evening. Doctors call it sundowning, or sundown syndrome. Fading light may be the trigger, and the symptoms may worsen as the night progresses and then get better by morning. Sundowning may be manifest as being agitated, confused, demanding, etc.

Using the calendar, motion sensors in the home or office, and/or user input, the vacuum cleaner system may be deployed while occupants are not present. A user can set priorities for the vacuum, such as, for example, clean the bedroom first (because the user has allergies), then the living room (where the party will be tomorrow), then the den (where the dog sleeps). The priorities can change over time, etc.

The cognitive system in an alternative embodiment applies to robot lawn mowers to focus more on regions of fast growth based on history and to avoid certain areas of a yard (e.g., garden, flowerbed, sprinkler system, playground, newly planted grass seed, areas with low or no growth, etc.). The cognitive system may also apply to pool cleaners, house gutter cleaners, window washing robots, etc.

In at least one embodiment, a network of vacuum cleaners manage the cleanup of large spaces, such as conference venues, factories, offices, etc., by sensing and anticipating the activity of humans and any other machinery to reason about the most suitable time and path to follow when cleaning. The vacuum cleaners can learn based on the history of dirt and other parameters and can seamlessly coordinate their activities, thus minimizing disruption to the event/on-going activities. Models of flocking behavior may be adjusted by taking one or more of the following rules into consideration when useful to achieve cleaning or sterilization goals (e.g., in hospitals), separation to avoid crowding neighbors (short range repulsion); alignment to steer towards average heading of neighbors; and/or, cohesion to steer towards the average position of neighbors (long range attraction).

Using active learning techniques and crowd-sourcing approaches, the system may learn about the user/group preferences. The system can further anticipate and predict, which activities tend to occur over time at large scale events by observing network behavior. Noise tolerant time-varying factor graphs can be employed to track and predict which user(s)/object(s) may trigger the vacuum operations.

Figure 1:
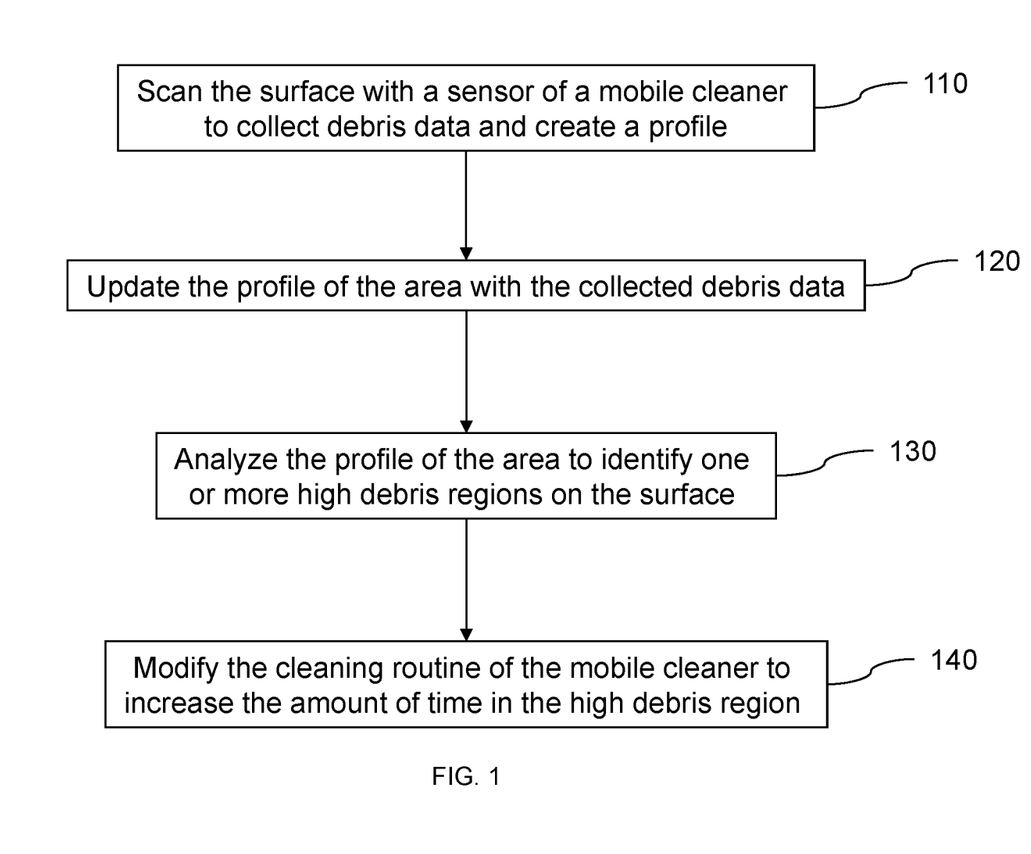
FIG. 1 is a flow diagram illustrating a method for cleaning a surface of an area according to an embodiment of the invention.

FIG. 1 is a flow diagram illustrating a method for cleaning a surface of an area according to an embodiment of the invention. In step 110, the surface can be scanned with a sensor of a mobile cleaner to collect debris data and a profile created, where the debris data can include an amount and/or location of debris on the surface. For example, the collected debris data can include 23 $cm^2$ of debris at GPS coordinates XYZ. In step 120, the profile of the area is updated with the collected debris data.

In step 130, the profile of the area can be analyzed to identify one or more high debris regions on the surface. A high debris region can include an amount of debris that exceeds a high debris region threshold (e.g., 50 $cm^2$, 10% of area) above a first threshold percentage of time (e.g., 50% of the time the mobile cleaner is in the region). In another embodiment, a region of the area is categorized as a high debris region when the region includes an amount of debris that exceeds the high debris region threshold for a threshold number of times within a specified time window (e.g., 6 out of last 10 times the mobile cleaner was in the region). In yet another embodiment, a region of the area is categorized as a high debris region when the region includes an amount of debris that exceeds the high debris region threshold above a threshold number of times in a row (e.g., 3 times in a row).

In step 140, the cleaning routine of the mobile cleaner is modified to increase the amount of time in the high debris region. The modification of the cleaning routine can also include increasing the suction power of the mobile cleaner in the at least one high debris region, decreasing the speed of movement of the mobile cleaner in the high debris region, and/or deploying one or more additional brushes on the mobile cleaner.

In at least one embodiment of the invention, the analysis of the collected debris data includes identifying one or more low debris regions of the surface, where a low debris region includes an amount of debris below a low debris region threshold (e.g., 40 $cm^2$) above a second threshold percentage of time (e.g., 30% of the time the mobile cleaner is in the region). The modification of the cleaning routine of the mobile cleaner can include decreasing the amount of time in the low debris region, increasing the speed of movement of the mobile cleaner in the low debris region, and/or decreasing the suction power of the mobile cleaner in the low debris region.

In at least one embodiment of the invention, a controller (described in more detail below) can modify the cleaning routine of the mobile cleaner based on the profile of a user. When the profile of the user indicates that the user is in a first cohort, the cleaning routine can be modified to increase the cleaning time of the mobile cleaner, increase the suction power of the mobile cleaner, and/or decrease the speed of movement of the mobile cleaner. Cohorts that may be more fussy or interested in cleanliness can include people concerned about germs or with little children who may be in intimate contact with a floor. Similarly, families with an immunocompromised individuals may have heighten concern for cleanliness. The desire for cleanliness can have a social and cultural dimension beyond the requirements of hygiene. Also, people preparing for stem cell transplants may be asked to carefully clean the home before the transplant. For example, those who will have such transplants are sometimes asked to clean areas in which they plan to spend most of the time after the transplant. A goal of the first cohort may be to remove dust, mold, mildew, and other small particles. The home should also remain clean when the person returns home from the hospital.

When the profile of the user indicates that the user is in a second cohort, the cleaning routine can be modified to decrease the cleaning time of the mobile cleaner, decrease the suction power of the mobile cleaner, and increase the speed of movement of the mobile cleaner. Certain cohorts may be less fussy or interested in cleanliness, or may be neater and less likely to track in dirt from outside the home. This second cohort may also include people without pets and children and who may not be smokers, etc.

In at least one embodiment of the invention, the sensor is an optical sensor and the debris data includes types of debris on the surface as detected by the optical sensor. The processor can estimate the cohort of the user (e.g., pet owner, parents, smoker) based on the type of debris on the surface. The processor can receive audio data from a microphone of the mobile cleaner, where the audio data can include pet sounds, baby sounds, and/or children sounds. The audio data can be captured continuously or at preset intervals (e.g., every 30 minutes). The processor can determine the cohort of the user based on the audio data. In addition, the processor can receive a surface plan from the user that includes the furniture on the surface (e.g., highchair, crib, wheel chair, litter box, scratching post, dog crate, etc.). The processor can estimate the cohort of the user based on the surface plan.

The processor can identify one or more common problem areas on the surface based on the profile of the user and/or the cohort of the user (e.g., fireplace, bottom of stairs, couch, coffee table, kitchen table, etc.). The controller can increase the amount of time of the mobile cleaner in the common problem area, increase the suction power of the mobile cleaner in the common problem area, and/or decrease the speed of movement of the mobile cleaner in the common problem area. The processor can also identify a region of the surface that the user is commonly located during a time period (e.g., kitchen from 7:00 AM-7:30 AM; bedroom from 10:00 PM-7:00 AM; office from 4:00 PM-8:00 PM). The controller can avoid the region of the surface that the user is commonly located during the time period so as to not interfere with the user.

In at least one embodiment, the sensor is an optical sensor and the debris data includes the types of debris on the surface. The processor can analyze the collected debris data to identify type(s) of debris that are located at specific location(s) above a threshold percentage of time (e.g., crumbs near the couch). The processor can sending a message to the user indicating that the identified type of debris is commonly located at the location. The processor can receive input (e.g., from the user, pulled from calendar) indicating an event (e.g., party, play date, meeting) at a region of the surface during a time period (e.g., 7:00 PM-8:00 PM). The controller can have the mobile cleaner avoid the region of the surface during the time period and clean the region of the surface a predetermined amount of time (e.g., 10 minutes) after the time period.

Figure 2:
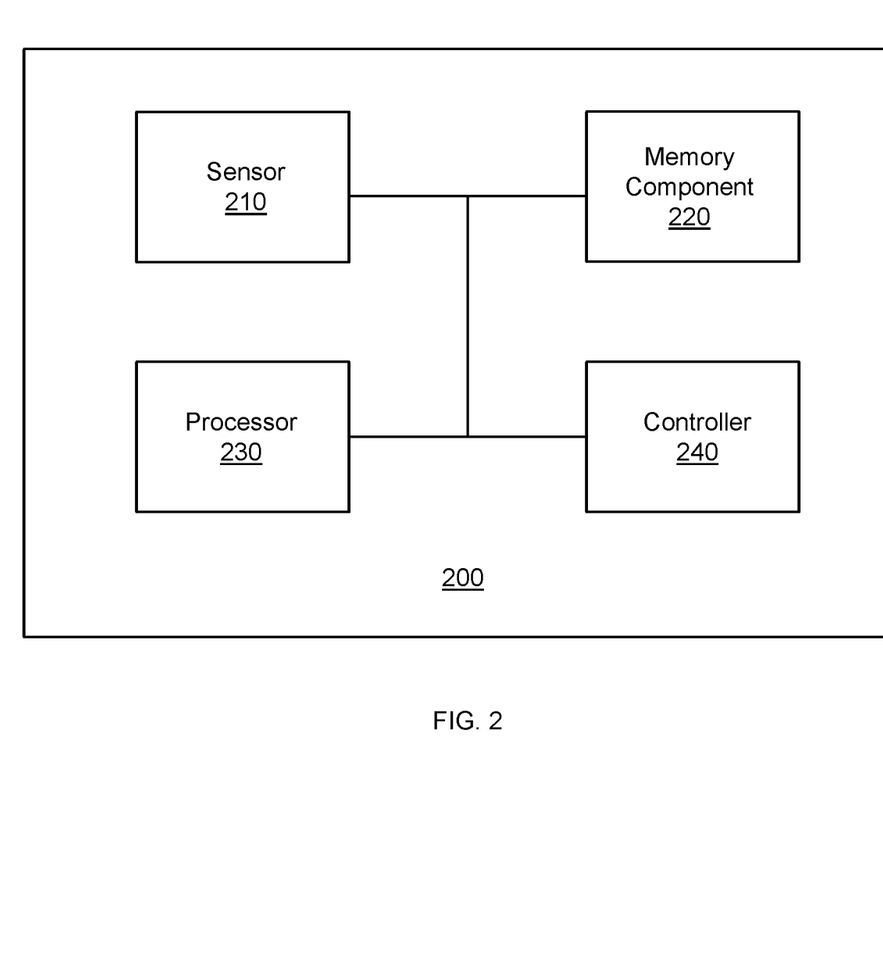
FIG. 2 illustrates a system for cleaning a surface of an area according to an embodiment of the invention.

FIG. 2 illustrates a system 200 for cleaning a surface of an area according to an embodiment of the invention. A sensor 210 on a mobile cleaner can be configured to scan the surface to collect debris data, which can include the amount and location of debris on the surface. A memory component 220 connected to the sensor 210 can be configured to include a profile of the area, where the profile of the area includes the collected debris data. As used herein, the term "connected" includes operationally connected, logically connected, in communication with, physically or wirelessly connected, engaged, coupled, contacts, linked, affixed, and attached. The memory component 220 can be located on the mobile cleaner or external to and in wireless communication with the mobile cleaner.

A processor 230 connected to the memory component 220 can be configured to analyze the profile of the area to identify one or more high debris regions on the surface. A high debris region can include an amount of debris that exceeds a high debris region threshold (e.g., 100 cm$^2$) above a first threshold percentage of time (e.g., 70% of the times that the mobile cleaner is in the region). As used herein, the term "processor" includes a computer hardware device, such as, for example, a CPU, integrated circuit, or microprocessor.

A controller 240 connected to the processor 230 can be configured to modify the cleaning routine of the mobile cleaner to increase the amount of time in the high debris region. As used herein, the term "controller" includes a computer hardware device, such as, for example, a CPU, integrated circuit, or microprocessor. The controller 240 can modify the cleaning routine of the mobile cleaner based on a profile of a user, where the controller can increase the cleaning time of the mobile cleaner when the profile of the user indicates that the user is in a first cohort, increase the suction power of the mobile cleaner when the profile of the user indicates that the user is in the first cohort, decrease the speed of movement of the mobile cleaner when the profile of the user indicates that the user is in the first cohort, decrease the cleaning time of the mobile cleaner when the profile of the user indicates that the user is in a second cohort, decrease the suction power of the mobile cleaner when the profile of the user indicates that the user is in the second cohort, and/or increase the speed of movement of the mobile cleaner when the profile of the user indicates that the user is in the second cohort. The controller 240 can increase the suction power of the mobile cleaner in the high debris region, decrease the speed of movement of the mobile cleaner in the high debris region, and/or deploy one or more additional brushes on the mobile cleaner.

The processor 230 can identify one or more low debris regions on the surface that include an amount of debris below a low debris region threshold above a second threshold percentage of time. The controller 240 can modify the cleaning routine of the mobile cleaner to decrease the amount of time in the low debris region, increase the speed of movement of the mobile cleaner in the low debris region, and/or decrease the suction power of the mobile cleaner in the low debris region.

The sensor 210 can be an optical sensor and the debris data can include types of debris on the surface. The processor 230 can estimate the cohort of the user based on the type of debris on the surface. The system 200 can include a microphone connected to the processor 230, where the microphone can be configured to receive audio input (e.g., pet sounds, baby sounds, children sounds). An interface connected to the processor 230 can be configured to receive a surface plan from the user, where the surface plan can include furniture on the surface. The processor 230 can estimate the cohort of the user based on the audio input and/or the surface plan.

The processor 230 can identify one or more common problem areas on the surface based on the profile of the user and/or the cohort of the user. The controller 240 can increase the amount of time of the mobile cleaner in the common problem area, increase the suction power of the mobile cleaner in the common problem area, and/or decrease the speed of movement of the mobile cleaner in the common problem area. The processor 230 can identify a region of the surface that the user is commonly located during a time period (e.g., using the calendar, motion sensors in the home or office, and/or user input). The controller 240 can avoid the region of the surface that the user is commonly located during the time period.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
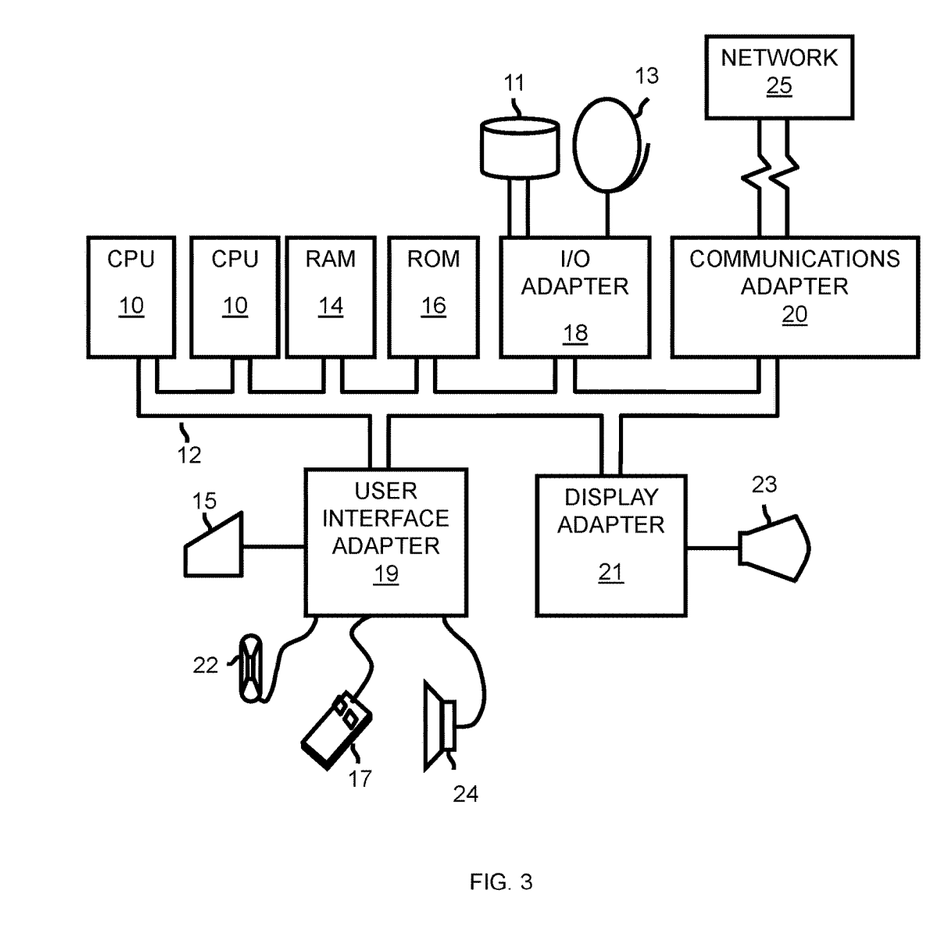
FIG. 3 is a diagram illustrating a computer program product for cleaning a surface of an area according to an embodiment of the invention.

Referring now to FIG. 3, an exemplary system in a network environment for practicing at least one embodiment of the invention is depicted. As depicted, the system comprises at least one processor or central processing unit (CPU) 510. The CPU(s) 510 are interconnected with system bus 12 to various devices such as computer readable storage media—including but not limited to random access memory (RAM) 14, and read-only memory (ROM) 16—and an input/output (I/O) adapter 18 devices. The I/O adapter 18 can connect to peripheral devices, such as disk units 11 and tape drives 13, or other computer readable program storage devices. The system can read the inventive computer instructions on the computer readable storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a network 25, and a display adapter 21 connects the bus 12 to a display device 23 which may be embodied as an output device such as a monitor, printer, or transmitter, for example.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for modifying a cleaning routine of a mobile cleaner, said method comprising:

receiving a surface plan from a user and audio input from a microphone, the surface plan including furniture on a surface area;

traversing the surface area via a mobile cleaner;

scanning the surface area and collecting debris data including amounts and locations of debris on the surface area;

analyzing collected debris data and identifying at least one location of the surface area as having an amount of debris that differs from a threshold;

determining a cohort of the user based on at least one of the audio input and surface plan; and modifying the cleaning routine as a function of said analyzing, identifying, and determining.

2. The method according to claim 1, wherein the sensor includes an optical sensor and the debris data includes a type of debris on the surface area, and further comprising:

analyzing the collected debris data to identify a type of debris at a location, and sending a message indicating the type of debris at the location.

3. The method of claim 2, wherein said scanning the surface area and collecting debris data further includes optically scanning the surface area and updating a surface area profile in response to said optically scanning the surface area.

4. The method of claim 3, further comprising:

identifying a type of surface area based on input from the optical sensor;

identifying a type of floor based on at least one of input from the optical sensor, friction and smoothness of the surface;

modifying the cleaning routine further based on the type of surface and the type of floor.

5. The method according to claim 1, further comprising:

identifying a region of the surface area as commonly occupied during a time period; and modifying the cleaning routine to avoid the region of the surface that is commonly occupied during the time period, in response to said identifying.

6. The method according to claim 1, further comprising:

receiving information about an event at a region of the surface area during a time period;

modifying the cleaning routine to avoid the region of the surface area associated with the event during the time period; and cleaning the region of the surface area a predetermined amount of time after the time period.

7. The method of claim 1, wherein said analyzing collected debris data and identifying a first location further: includes identifying a first location of the surface area as a high debris region, and modifying the cleaning routine in the high debris region.

8. The method of claim 7, further comprising:

identifying the high debris region as a common problem area on the surface area; and modifying the cleaning routine in response to identifying the high debris region as a common problem area.

9. The method of claim 1, wherein the determining of the cohort is based on the audio input and surface plan.

10. The method of claim 9, wherein the determining of the cohort is further based on types of debris identified from the debris data.

11. The method of claim 10, wherein the determining of the cohort is further based on the age and health of the user.

12. The method of claim 1, wherein the modifying of the cleaning routine includes targeting specific types of debris based on the determined cohort.

13. A system for modifying a cleaning routine of a mobile device, said system comprising:
- a microphone configured to receive audio input a sensor communicably coupled to on a mobile cleaner, said sensor configured to scan a surface to collect debris data, the debris data including an amount of debris and a location of debris on the surface;
- a memory storing a profile of the surface and collected debris data;
- a processor communicably coupled to connected to said memory, said processor configured to
- receive a surface plan including furniture on the surface,
- analyze the collected debris data to identify a first location of the surface area, as including an amount of debris that differs from a threshold, and
- determine a cohort of at least one user of the mobile cleaner based on at least one of the audio input and surface plan; and
- a controller communicably coupled to said processor, said controller configured to modify the cleaning routine as a function of the analyzed debris data and the determined cohort.

14. The system according to claim 13,
- wherein the controller modifies the cleaning routine of the mobile cleaner by selecting from a group consisting of: an increase in a cleaning time of the mobile cleaner; an increase in suction power of the mobile cleaner; a decrease in speed of movement of the mobile cleaner; a decrease in the cleaning time of the mobile cleaner; a decrease in the suction power of the mobile cleaner; and an increase in the speed of movement of the mobile cleaner.

15. The system according to claim 13, wherein
- said processor identifies at least one low debris region on the surface, the at least one low debris region including an amount of debris below a low debris region threshold, wherein said controller modifies the cleaning routine of the mobile cleaner, and
- the modification is selected from the group consisting of: decrease an amount of time in the at least one low debris region, increase a speed of movement of the mobile cleaner in the at least one low debris region, and decrease a suction power of the mobile cleaner in the at least one low debris region.

16. The system according to claim 13, wherein
- said sensor includes an optical sensor, the sensor being configured to detect types of debris on the surface, and
- said processor is further configured to modify the profile of the area based on the type of debris detected on the surface.

17. The system according to claim 13,
- wherein said microphone is configured to receive audio input selected from a group consisting of pet sounds, baby sounds, and children sounds.

18. The system according to claim 13, wherein
- said processor identifies at least one common problem area on the surface based on the cohort of the user, and
- said controller modifies the cleaning routine of the mobile cleaner, the modification being selected from the group consisting of increasing an amount of time of the mobile cleaner in the common problem area, increasing a suction power of the mobile cleaner in the common problem area, and decreasing a speed of movement of the mobile cleaner in the common problem area.

19. The system according to claim 13, wherein
- said processor identifies a region of the surface at which an object is located during a time period, and
- said controller avoids the region of the surface that the object is located during the time period.

20. A non-transitory computer-readable medium having computer-readable instructions stored thereon which when executed by a computer cause the computer to perform a method for modifying a cleaning routine of a mobile cleaner, said method comprising:
- receiving a surface plan from the user and audio input, the surface plan including furniture on a surface area;
- control a mobile cleaner to traverse the surface area;
- scanning the surface area and collecting debris data including amounts and locations of debris on the surface area;
- analyzing collected debris data and identifying at least one location of the surface area as having an amount of debris that differs from a threshold;
- determining a cohort of at least one user of the mobile cleaner based on at least one of the audio input and surface plan; and
- modifying the cleaning routine as a function of the analyzing, identifying and determining.

* * * * *